(12) United States Patent
Mito et al.

(10) Patent No.: US 9,213,498 B2
(45) Date of Patent: Dec. 15, 2015

(54) MEMORY SYSTEM AND CONTROLLER

(71) Applicant: Kabushiki Kaisha Toshiba, Minato-ku (JP)

(72) Inventors: Daisuke Mito, Kawasaki (JP); Yoshihisa Kojima, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 168 days.

(21) Appl. No.: 14/169,369

(22) Filed: Jan. 31, 2014

(65) Prior Publication Data

US 2015/0067276 A1   Mar. 5, 2015

Related U.S. Application Data

(60) Provisional application No. 61/873,186, filed on Sep. 3, 2013.

(51) Int. Cl.
*G06F 12/00* (2006.01)
*G06F 3/06* (2006.01)

(52) U.S. Cl.
CPC ............ *G06F 3/0659* (2013.01); *G06F 3/0611* (2013.01); *G06F 3/0683* (2013.01); *G06F 3/0613* (2013.01)

(58) Field of Classification Search
None
See application file for complete search history.

(56) References Cited

U.S. PATENT DOCUMENTS

| | | | |
|---|---|---|---|
| 7,373,460 B2 | 5/2008 | Kobayashi et al. |
| 7,493,450 B2 | 2/2009 | Bearden |
| 8,225,047 B2 | 7/2012 | Yano et al. |
| 2008/0229027 A1 | 9/2008 | Shioya et al. |
| 2012/0144123 A1 | 6/2012 | Aronovich et al. |

FOREIGN PATENT DOCUMENTS

| | | |
|---|---|---|
| JP | 2006-139548 | 6/2006 |
| JP | 2008-225914 | 9/2008 |
| JP | 2009-211217 | 9/2009 |

*Primary Examiner* — Brian Peugh
(74) *Attorney, Agent, or Firm* — Oblon, McClelland, Maier & Neustadt, L.L.P.

(57) ABSTRACT

According to one embodiment, according to one embodiment, a memory system includes a first memory, a second memory, an interface, a managing unit, and a control unit. The second memory stores data read out from the first memory. The interface receives a read command. The managing unit manages a corresponding relationship of a first address included in the read command and a second address. The second address is an address indicating a position in the first memory where data designated by the first address is stored. The control unit acquires a plurality of second addresses corresponding to a sequential first address range including the first address in a case where the read command is received, and determine an amount of data to be read out from the first memory to the second memory based on whether the plurality of second addresses is sequential or not.

16 Claims, 5 Drawing Sheets

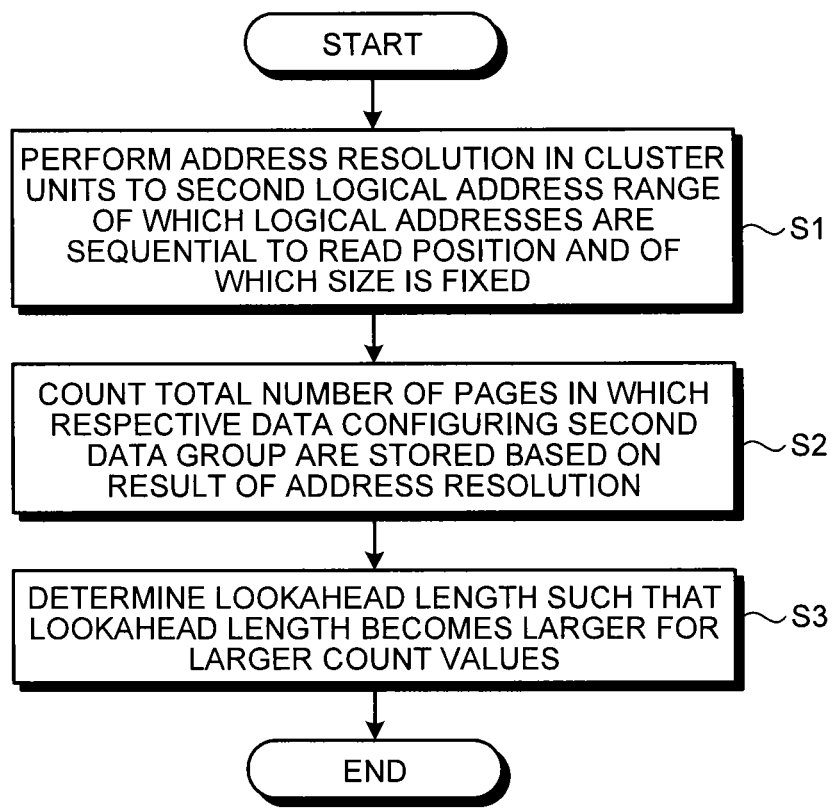

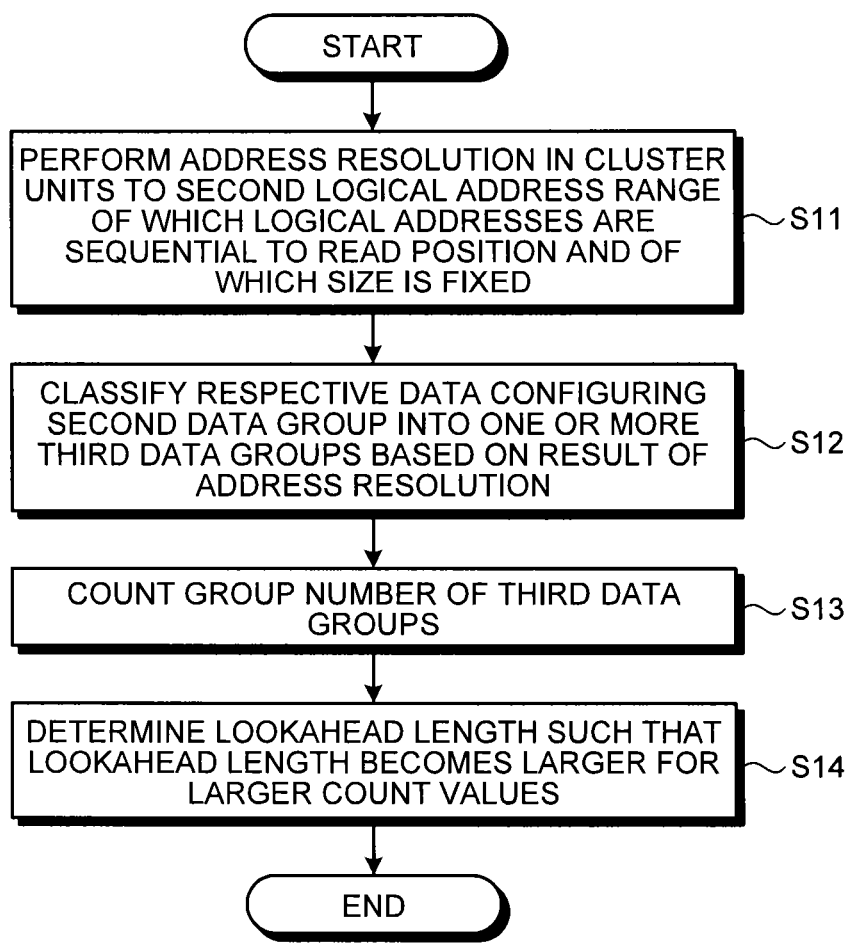

MEMORY SYSTEM AND CONTROLLER

CROSS-REFERENCE TO RELATED APPLICATIONS

This application is based upon and claims the benefit of priority from U.S. Provisional Patent Application No. 61/873186, filed on Sep. 3, 2013; the entire contents of which are incorporated herein by reference.

FIELD

Embodiments described herein relate generally to a memory system and a controller.

BACKGROUND

As a memory system used in a computer system and the like, an SSD (Solid State Drive) that installs memory chips provided with NAND type memory cell arrays is drawing attention. The SSD has advantages such as fast speed, light weight and the like compared to a magnetic disk device.

The SSD internally performs lookahead to improve read performance upon a sequential read. The sequential read is an access pattern that reads sequentially in an arrangement order of logical addresses. A target of the lookahead is data with a predetermined size (lookahead length) with a logical address that is continued from a storage position of data of which read has been requested. If the lookahead length is too small, the read performance is deteriorated. If the lookahead length is too large, a delay amount (penalty) generated upon a prediction failure, that is, when data different from the data that had been looked ahead is requested to be read becomes large.

BRIEF DESCRIPTION OF THE DRAWINGS

FIG. 4 is a flow chart explaining a calculation method of a lookahead length of the first embodiment.

FIG. 5 is a flow chart explaining a calculation method of a lookahead length of a second embodiment.

DETAILED DESCRIPTION

In general, according to one embodiment, a memory system includes a first memory, a second memory, an interface, a managing unit, and a control unit. The second memory is configured to store data read out from the first memory. The interface is configured to receive a read command from outside the memory system. The managing unit is configured to manage a corresponding relationship of a first address included in the read command and a second address. The second address is an address indicating a position in the first memory where data designated by the first address is stored. The control unit is configured to acquire a plurality of second addresses corresponding to a sequential first address range including the first address included in the read command in a case where the read command is received, and determine an amount of data to be read out from the first memory to the second memory in response to the read command based on whether the plurality of second addresses is sequential or not.

Hereinbelow, embodiments of the memory system will be described in detail with reference to the attached drawings. Note that these embodiments do not limit the present invention. Further, hereinbelow, a case of adapting the memory system of the embodiments of the invention to an SSD will be described; however, the memory system of the embodiments of the invention may be adapted to memory systems other than the SSD.

First Embodiment

Figure 1:
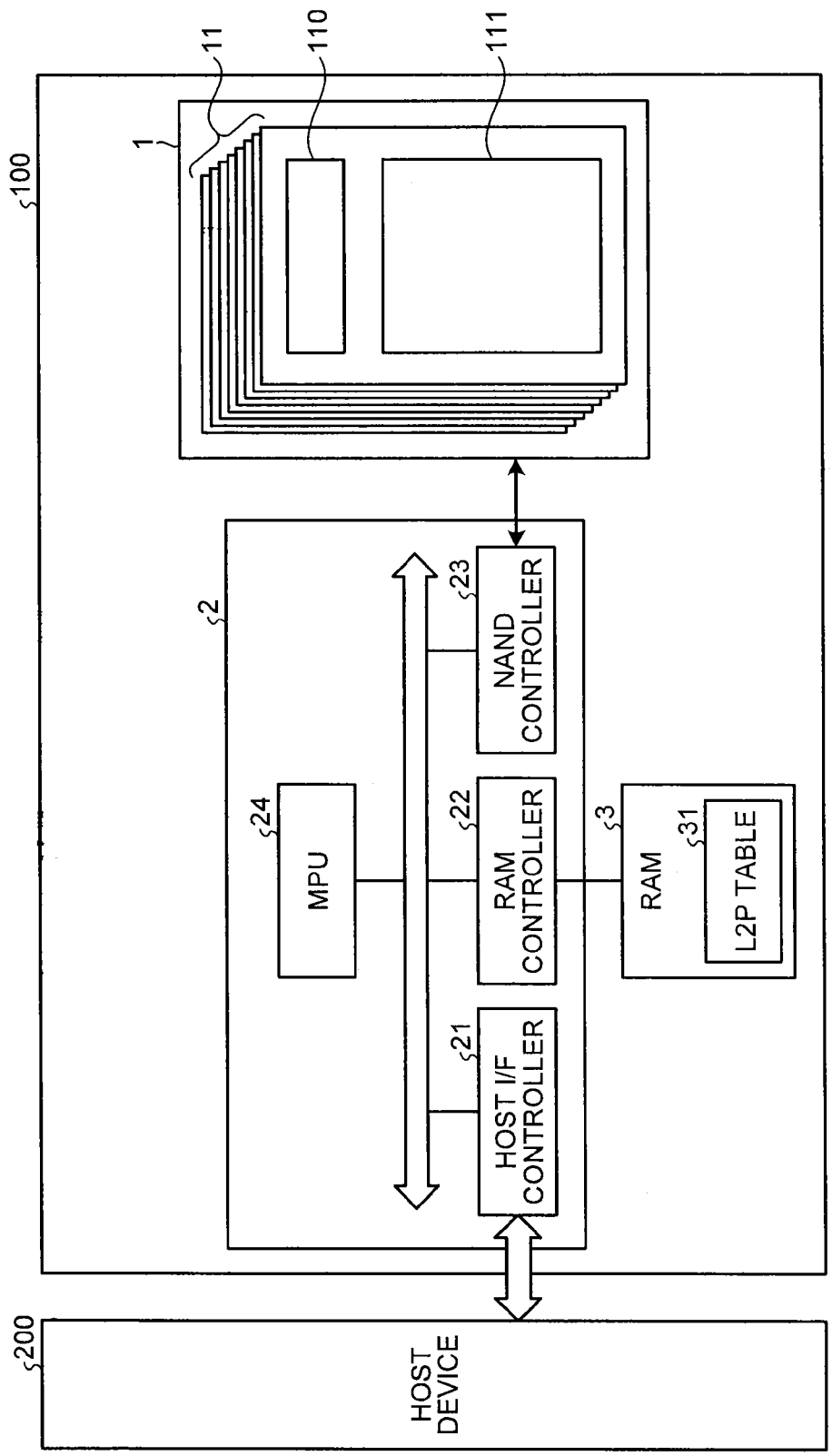
FIG. 1 is a diagram illustrating a configurational example of an SSD of a first embodiment of the invention.

FIG. 1 is a diagram illustrating a configurational example of an SSD of a first embodiment of the invention. As is illustrated, an SSD 100 is connected to a host device 200 by a predetermined communication interface. As the host device 200, a mobile type information processing device such as a personal computer corresponds thereto. The SSD 100 functions as an external storage device of the host device 200. The SSD 100 can accept an access request (read request and write request) from the host device 200. The access request includes a logical address designating a storage position (read position and write position) of data that is an access target. Hereafter, the read position and the write position may collectively be described as an access destination. Further, a logical address designating the access destination will be described as a logical address of the access destination.

An access pattern from the host device 200 to the SSD 100 is largely classified into a sequential access (sequential write, sequential read) and a random access (random write, random read). The sequential access is an access pattern in which a plurality of read/write requests is made sequentially so that the logical addresses of the access destinations of the plurality of read/write requests become successive in an ascending order or a descending order. The random access is an access pattern in which a plurality of read/write requests is made intermittently so that the logical addresses of the access destinations of the plurality of read/write requests do not become successive.

The SSD 100 includes NAND memory 1 as nonvolatile first memory, a controller 2, and RAM 3 as a second memory that is faster than the first memory. Notably, as the nonvolatile first memory, memories other than the NAND memory 1 may be adapted. For example, a NOR type flash memory may be adapted.

The NAND memory 1 is provided with a plurality (eight herein) of memory chips 11. Each memory chip 11 is provided with a buffer 110, and a memory cell array 111 that stores data sent from the host device 200. The memory cell array 111 is provided with a plurality of NAND strings configured by a plurality of memory cells being connected. Further, the memory cell array 111 is configured by being provided with blocks that are to be units of erasure. Each block is configured by being provided with a plurality of pages (storage regions) to be units of write/read on the memory cell array 111. Notably, each memory chip 11 can accept read/write commands that read/write in units called clusters that are smaller than a page. The buffer 110 can buffer at least one page worth of data. Upon receiving the read command, each memory chip 11 firstly reads out the one page worth of data including data that is the read target in cluster units to the buffer 110 from the memory cell array 111, and thereafter sends the data that is the read target among the data buffered in the buffer 110.

The controller 2 executes write and read on the NAND memory 1 in response to the access request received from the host device 200. Upon writing, the controller 2 records a corresponding relationship of the logical address of the write position and the physical address of the write position in a L2P table 31. The L2P table 31 is loaded in the RAM 3. The controller 2 updates the L2P table 31 loaded in the RAM 3 upon writing.

The RAM 3 provides a region for the controller 2 to temporarily store read/write data. Further, the RAM 3 provides a region for temporarily storing various types of management information including the L2P table 31 that records the correspondence information of the logical address and the physical position (physical address) in the memory cell array 111.

The controller 2 includes a host interface controller (host I/F controller) 21, a RAM controller 22, a NAND controller 23, and an MPU 24. The host I/F controller 21, the RAM controller 22, the NAND controller 23 and the MPU 24 are connected to one another by a bus.

The host I/F controller 21 executes control of a communication interface with the host device 200, and control of data transfer between the host device 200 and the RAM 3. The RAM controller 22 controls read/write of data on the RAM 3. The NAND controller 23 executes control of data transfer between the NAND memory 1 and the RAM 3. The MPU 24 executes control of an entirety of the controller 2 based on firmware.

In executing the read/write on each memory chip 11, the MPU 24 generates the read/write command for each memory chip 11 for every cluster. The read/write command for each memory chip 11 includes the physical address (physical address of the access destination) designating the access destination (read position/write position). The NAND controller 23 is provided with a command queue (not illustrated) that temporarily stores a command. The MPU 24 stores the generated read/write command in the command queue provided in the NAND controller 23. The NAND controller 23 sends the read/write command stored in the command queue to the memory chip 11 corresponding to the physical address of the access destination.

Notably, the MPU 24 manages the L2P table 31. Upon reading, the MPU 24 can translate the logical address of the read position designated by the read request to a physical address by referencing the L2P table 31. Hereafter, translating the logical address to the physical address may be described as an address resolution.

Further, the MPU 24 can execute lookahead upon reading. Specifically, upon when the read request is made from the host device 200, the MPU 24 generates the read command as all of data stored in first logical address ranges of which logical addresses are successive to the read position (first data group) as read targets. Notably, respective data configuring the first data group (and a second data group to be described later) is data in cluster units.

Here, a size of the first logical address range (lookahead length) can be changed. The MPU 24 determines the lookahead length according to over how many pages all of the data stored in the second logical address range (second data group) of which logical address is sequential to the read position is dispersed. The MPU 24 sets the lookahead length to a larger value for larger number of pages in which the second data group is stored.

Figure 2:
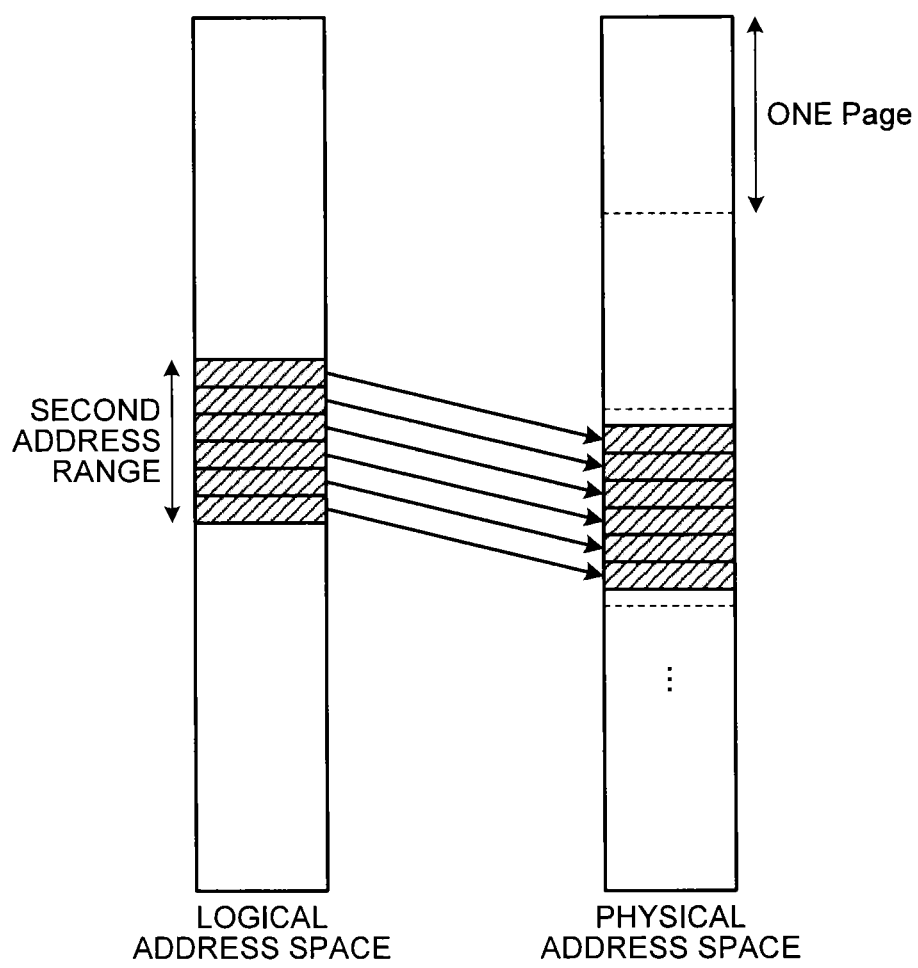
FIG. 2 is a diagram illustrating a corresponding relationship of a logical address and a physical address in a case where sequential write is performed.
Figure 3:
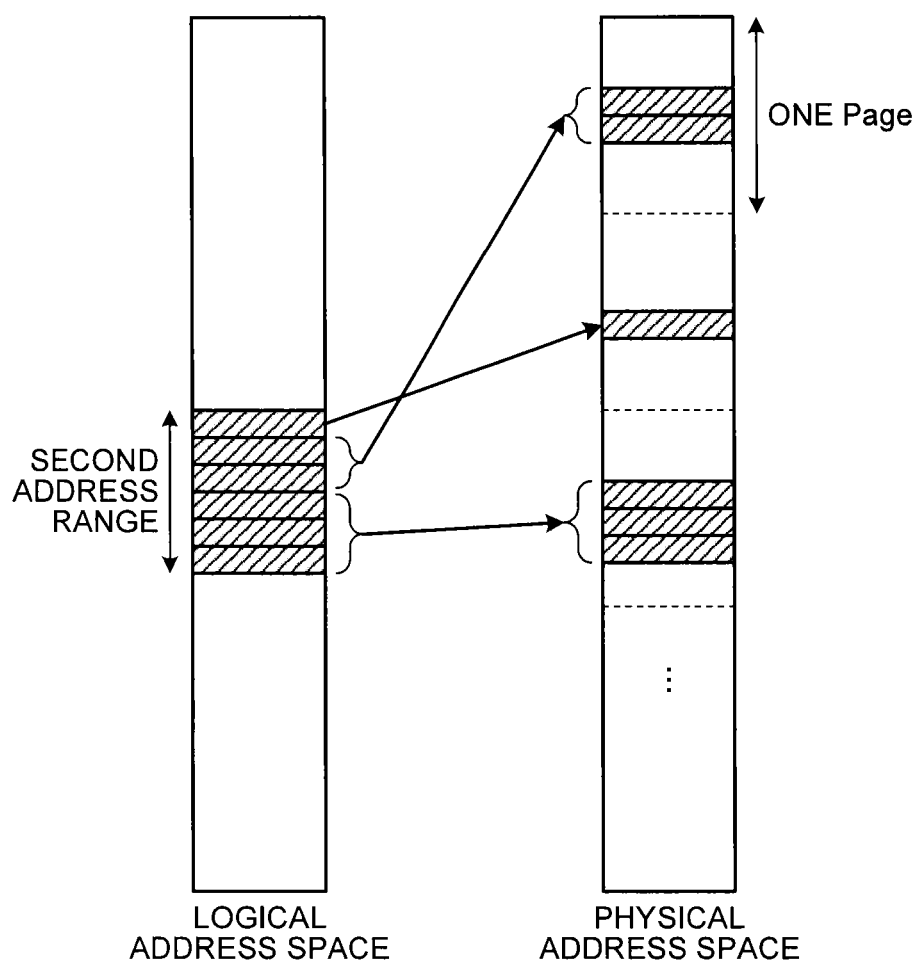
FIG. 3 is a diagram illustrating a corresponding relationship of the logical address and the physical address in a case where random write is performed.

FIG. 2 is a diagram illustrating a corresponding relationship of the logical address and the physical address in a case where the second data group is written by the access pattern of the sequential write. FIG. 3 is a diagram illustrating a corresponding relationship of the logical address and the physical address in a case where the second data group is written by the access pattern of the random write. Each of hatched boxes respectively indicates data in cluster units. Further, dots drawn in a physical address spaces indicate boundaries between pages.

Upon writing, the MPU 24 can write so that the physical addresses of the write positions become sequential in the ascending order in an order as the write is requested. Accordingly, in the case where the second data group is written by the access pattern of the sequential write, as illustrated in FIG. 2, all of the data configuring the second data group are stored in the memory cell array 111 so that their physical addresses become sequential. Thus, the second data group is stored in a relatively small number of pages (one page herein).

On the other hand, in the case where the second data group is written by the access pattern of the random write, as illustrated in FIG. 3, the physical address of the store destination of each of the data configuring the second data group is not sequential. Thus, the second data group is stored by being dispersed in a relatively large number of pages (three pages herein).

FIG. 4 is a flow chart explaining a calculation method of the lookahead length of the first embodiment.

When the read request is received from the host device 200, the MPU 24 performs the address resolution in cluster units to a second logical address range of which logical addresses are sequential to the logical address included in the read request (S1). That is, the MPU 24 performs the address resolution for each of data in a cluster size configuring the second data group stored in the second logical address range. The size of the second logical address range is fixed, as aforementioned. Notably, the process of step S1 is equivalent to calculating the physical address of the storage position of each of the data in cluster units configuring the second data group. The address resolution is executed by referencing L2P table 31.

Then, the MPU 24 counts a total number of pages in which the respective data configuring the second data group are stored based on a result of the address resolution (S2). For example, in the case of FIG. 2, the count value is "1", since all of the data are stored in one page. In the case of FIG. 3, the count value is "3", since all of the data are stored in three pages by being dispersed.

Then, the MPU 24 determines the lookahead length such that the lookahead length becomes larger for larger count values obtained in the process of step S2 (S3). Then, an operation of calculating the lookahead length is ended.

Notably, an algorithm for calculating the lookahead length from the count value in step S3 is not limited to a particular algorithm. Any voluntary algorithm may be employed as the algorithm so long as the lookahead length becomes larger for cases where the count value is large compared to the cases where the count value is small. For example, an algorithm by which the lookahead length increases in steps as the count value increases may be employed. Further, an algorithm by which the lookahead length increases sequentially as the count value increases may be employed. Further, an algorithm by which a first set value is determined as the lookahead length in a case where the count value is smaller than a first threshold value, a second set value that is larger than the first set value is determined as the lookahead length in a case where the count value is larger than a second threshold value that is larger than the first threshold value, and a value that monotonously increases in steps or sequentially according to the count value is determined as the lookahead length in a case where the count value is a value between the first threshold value and the second threshold value may be employed.

After having calculated the lookahead length, the MPU 24 generates the read commands in cluster units with the first data group determined by the calculated lookahead length as the read target. Among the read commands in cluster units with the first data group as the read target, in a case where an already-generated read command exists, the MPU 24 generates only the read commands that have not yet been generated. Due to this, the SSD 100 always reads data in advance each time the read request is received from the host device 200, where the data being stored in a changeable range in which the logical address is sequential to the read position designated by the read request.

Notably, the controller 2 temporarily stores the data (lookahead data) read out from the NAND memory 1 by the lookahead in a memory (which is herein RAM 3) that is faster than the NAND memory 1. The controller 2 sends the lookahead data stored in the RAM 3 to the host device 200 in a case where a new read request setting a position where the logical address sequentially follows the access destination of the read request that was received most recently as the access destination is received. Due to this, the controller 2 can make a response faster compared to a case of reading the data related to the new read request from the NAND memory 1.

As above, according to the first embodiment, the controller 2 calculates the number of pages in which the one or more data (second data group), which designates the second logical address range of which logical address is sequential from the read position as the write position, is written by using the L2P table 31 upon reading. Then, the controller 2 calculates the lookahead length so that the lookahead length becomes larger for cases with larger number of pages than for cases with smaller number of pages. Moreover, the controller 2 reads the data (first data group) written in the range of the size of the lookahead length (first logical address range) of which logical address is sequential from the read position in advance from the NAND memory 1.

In the case of reading the data written by the access pattern of the random write, the read performance can be improved by enlarging the lookahead length compared to the case of reading the data written by the access pattern of the sequential write. In other words, in the case of reading the data written by the access pattern of the sequential write, the read performance is not deteriorated even if the lookahead length is made small compared to the case of reading the data written by the access pattern of the random write. On the other hand, when the lookahead length is made large, the penalty upon the prediction failure becomes large. According to the first embodiment, since the SSD 100 is configured as above, the lookahead length is set to a small value upon reading the data written by the access pattern of the sequential write, and the lookahead length is set to a large value upon reading the data written by the access pattern of the random write. Accordingly, it becomes possible to make the penalty upon the prediction failure small without deteriorating the read performance upon reading the data written by the access pattern of the sequential write. Further, upon reading the data written by the access pattern of the random write, the read performance can be improved.

Second Embodiment

FIG. 5 is a flow chart explaining a calculation method of a lookahead length of a second embodiment.

When a read request is received from a host device 200, an MPU 24 performs address resolution in cluster units to a second logical address range of which logical addresses are sequential to a read position (S11). The process of step S11 may be the same as the process of step S1.

Then, the MPU 24 classifies respective data configuring a second data group into one or more third data groups based on a result of the address resolution (S12). Each third data group is configured of single data or two or more pieces of data of which physical addresses are sequential. Among the plurality of pieces of data configuring the second data group, the MPU 24 classifies two pieces of data of which physical addresses are sequential in the same third data group, and classifies two pieces of data of which physical addresses are not sequential in different third data groups.

For example, in the case of FIG. 2, all of the data are classified in one third data group. Further, in the case of FIG. 3, all of the data are classified into three third data groups.

Then, the MPU 24 counts a number of the third data groups (group number) (S13).

Then, the MPU 24 determines the lookahead length such that the lookahead length becomes larger for larger count values obtained in the process of step S13 (S14). Then, an operation of calculating the lookahead length is ended.

Notably, an algorithm for calculating the lookahead length from the count value in step S14 is not limited to a particular algorithm, similar to the first embodiment.

Upon reading the data written by the access pattern of the sequential write, since the count value obtained by the process of step S13 is a small value, the lookahead length is set to a small value. Upon reading the data written by the access pattern of the random write, since the count value obtained by the process of step S13 is a large value, the lookahead length is set to a large value. Accordingly, it becomes possible to make the penalty upon the prediction failure small without deteriorating the read performance upon reading the data written by the access pattern of the sequential write. Further, upon reading the data written by the access pattern of the random write, the read performance can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a first memory;
    a second memory configured to store data read out from the first memory;
    an interface configured to receive a read command from outside the memory system;
    a managing unit configured to manage a corresponding relationship of a first address included in the read command and a second address, the second address being an address indicating a position in the first memory where data designated by the first address is stored; and
    a control unit configured to acquire a plurality of second addresses corresponding to a sequential first address range including the first address included in the read command in a case where the read command is received, and determine an amount of data to be read out from the first memory to the second memory in response to the read command based on whether the plurality of second addresses is sequential or not.

2. The memory system according to claim 1, wherein
    the first memory includes a plurality of storage regions in a unit size, and the control unit is configured to count a number of the storage regions including memory regions designated by the plurality of second addresses, and determine the amount of data to be read out from the first memory to the second memory based on a count value of the number of the storage regions.

3. The memory system according to claim 2, wherein the control unit is configured to determine the amount of data to be read out from the first memory to the second memory so that the amount of data to be read out from the first memory to the second memory increases in steps or sequentially as the count value increases.

4. The memory system according to claim 3, wherein the control unit is configured to
determine the amount of data to be read out from the first memory to the second memory to be a first set value in a case where the count value is smaller than a first threshold value,
determine the amount of data to be read out from the first memory to the second memory to be a second set value that is larger than the first set value in a case where the count value is larger than a second threshold value that is larger than the first threshold value, and
determine the amount of data to be read out from the first memory to the second memory to be a value that monotonously increases in steps or sequentially according to the count value in a case where the count value is a value between the first threshold value and the second threshold value.

5. The memory system according to claim 1, wherein a first address of a storage position in the first memory of data to be read out from the first memory to the second memory in response to the read command is sequential to a first address included in the read command.

6. The memory system according to claim 1, wherein the control unit is configured to classify the plurality of second addresses so that two sequential second addresses belong to the same group, counts a classified group number, and determines the amount of data to be read from the first memory to the second memory based on a count value of the group number.

7. The memory system according to claim 6, wherein the control unit is configured to determine the amount of data to be read out from the first memory to the second memory so that the amount of data to be read out from the first memory to the second memory increases in steps or sequentially as the count value increases.

8. The memory system according to claim 7, wherein the control unit is configured to:
determine the amount of data to be read out from the first memory to the second memory to be a first set value in a case where the count value is smaller than a first threshold value,
determine the amount of data to be read out from the first memory to the second memory to be a second set value that is larger than the first set value in a case where the count value is larger than a second threshold value that is larger than the first threshold value, and
determine the amount of data to be read out from the first memory to the second memory to be a value that monotonously increases in steps or sequentially according to the count value in a case where the count value is a value between the first threshold value and the second threshold value.

9. A controller configured to execute control of a first memory, the control including storing data read out from the first memory in a second memory, the controller comprising:
an interface configured to receive a read command from outside the controller;
a managing unit configured to manage a corresponding relationship of a first address included in the read command and a second address, the second address being an address indicating a position in the first memory where data designated by the first address is stored; and
a control unit configured to acquire a plurality of second addresses corresponding to a sequential first address range including the first address included in the read command in a case where the read command is received, and determine an amount of data to be read out from the first memory to the second memory in response to the read command based on whether the plurality of second addresses is sequential or not.

10. The controller according to claim 9, wherein the first memory includes a plurality of storage regions in a unit size, and
the control unit is configured to count a number of the storage regions including memory regions designated by the plurality of second addresses, and determine the amount of data to be read out from the first memory to the second memory based on a count value of the number of the storage regions.

11. The controller according to claim 10, wherein the control unit is configured to determine the amount of data to be read out from the first memory to the second memory so that the amount of data to be read out from the first memory to the second memory increases in steps or sequentially as the count value increases.

12. The controller according to claim 11, wherein the control unit is configured to:
determine the amount of data to be read out from the first memory to the second memory to be a first set value in a case where the count value is smaller than a first threshold value,
determine the amount of data to be read out from the first memory to the second memory to be a second set value that is larger than the first set value in a case where the count value is larger than a second threshold value that is larger than the first threshold value, and
determine the amount of data to be read out from the first memory to the second memory to be a value that monotonously increases in steps or sequentially according to the count value in a case where the count value is a value between the first threshold value and the second threshold value.

13. The controller according to claim 9, wherein a first address of a storage position in the first memory of data to be read out from the first memory to the second memory in response to the read command is sequential to a first address included in the read command.

14. The controller according to claim 9, wherein the control unit is configured to classify the plurality of second addresses so that two sequential second addresses belong to the same group, counts a classified group number, and determines the amount of data to be read from the first memory to the second memory based on a count value of the group number.

15. The controller according to claim 14, wherein the control unit is configured to determine the amount of data to be read out from the first memory to the second memory so that the amount of data to be read out from the first memory to the second memory increases in steps or sequentially as the count value increases.

16. The controller according to claim 15, wherein the control unit is configured to:

determine the amount of data to be read out from the first memory to the second memory to be a first set value in a case where the count value is smaller than a first threshold value, determine the amount of data to be read out from the first memory to the second memory to be a second set value that is larger than the first set value in a case where the count value is larger than a second threshold value that is larger than the first threshold value, and determine the amount of data to be read out from the first memory to the second memory to be a value that monotonously increases in steps or sequentially according to the count value in a case where the count value is a value between the first threshold value and the second threshold value.

* * * * *